July 11, 1939.  D. GREGORY  2,165,751

LATHE AND OTHER MACHINE TOOL

Filed Aug. 22, 1938  2 Sheets-Sheet 1

D. Gregory
Inventor

By: Glascock Downing & Seebold
Attys.

July 11, 1939.    D. GREGORY    2,165,751
LATHE AND OTHER MACHINE TOOL
Filed Aug. 22, 1938    2 Sheets-Sheet 2

D. Gregory
Inventor

By: Glascock Downing & Seebold
Attys.

Patented July 11, 1939

2,165,751

UNITED STATES PATENT OFFICE 2,165,751

LATHE AND OTHER MACHINE TOOLS

Dennis Gregory, Coventry, England, assignor to A. C. Wickman Limited, Coventry, England Application August 22, 1938, Serial No. 226,158
In Great Britain September 8, 1937

3 Claims. (Cl. 29—37)

This invention relates to lathes or other machine tools of the kind in which is employed an intermittently-rotatable cylindrical part adapted to carry a plurality of tools or work pieces and provided with means whereby it can be secured to its support when at rest. When the said part is a heavy one, and is mounted with its axis horizontal in a circular bearing, considerable resistance occurs to rapid angular movement after the securing means have been released, and also liability to excessive wear of the surface, this being due to loss of lubricating oil from between the underside of the rotatable part and its support. The object of the present invention is to obviate this difficulty in a simple and convenient manner.

The invention comprises means for automatically supplying lubricant to the lower contiguous surfaces of the rotatable part and its bearing immediately prior to each movement of the said part.

Figure 1:
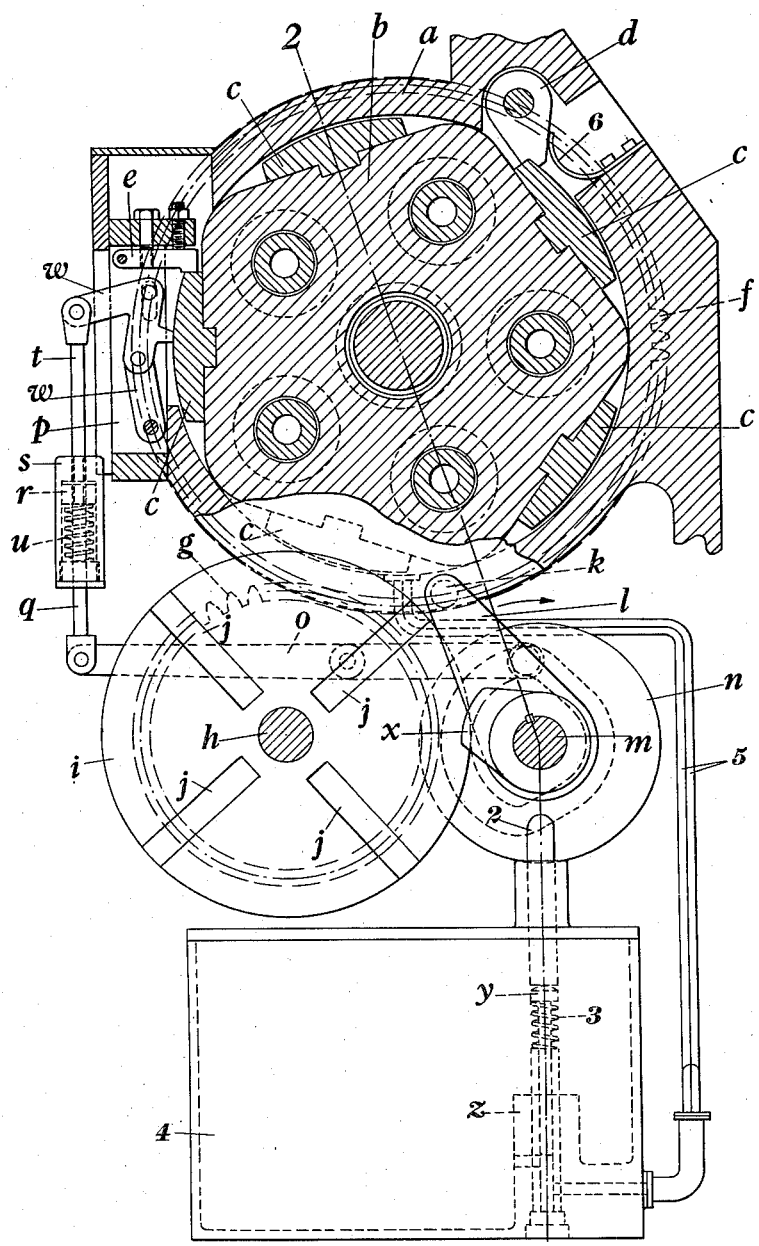
Figure 2:
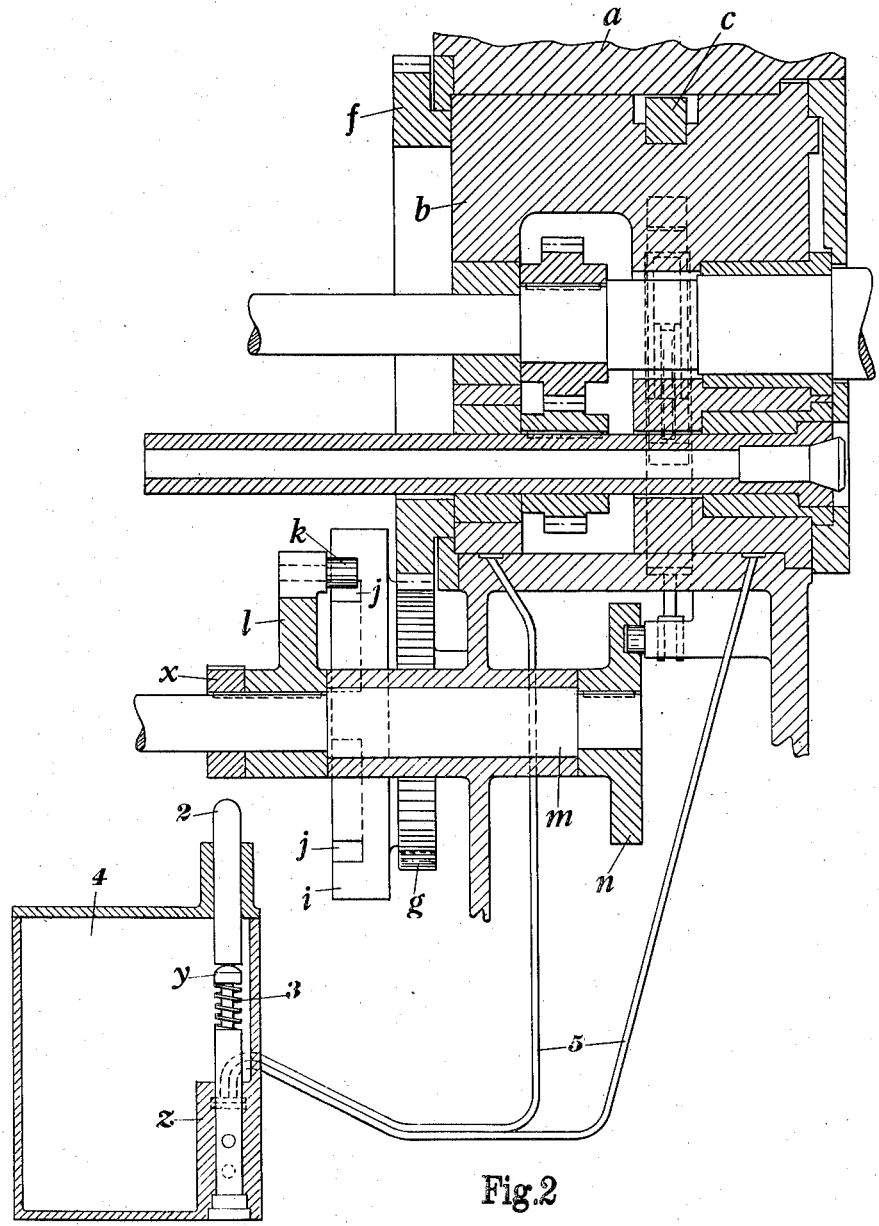

In the two accompanying sheets of explanatory drawings, Figure 1 is a sectional end view and Figure 2 a sectional side view on the line 2—2 of Figure 1 illustrating diagrammatically an application of the invention to a machine of the kind above-mentioned.

A part of the body of the said machine comprises a hollow cylindrical bearing $a$, in which is mounted a cylindrical member $b$ carried on a central shaft and rotatable about its horizontal axis. Longitudinally and eccentrically through the member $b$ are formed a number (in the example five) of bores for accommodating the usual spindles having tools or work holders arranged at their outer ends. Around the cylindrical member $b$ recesses are formed to receive ratchet pieces $c$ which are secured in the said recesses. These pieces co-operate with pawls $d$ and $e$ the purpose of which will be described later, the pawl $d$ being loaded by a spring 6.

Intermittent angular movements are given to the member $b$ by a pair of gear wheels $f$, $g$, the wheel $f$ being formed on or secured to the member $b$ and the wheel $g$ being secured on a spindle $h$. On the said spindle there is also secured a disc $i$ having in one of its faces four radial slots $j$ which can be engaged by a projection $k$ on a rotatable arm $l$, this latter being actuated as and when desired from any convenient source of motion acting on the spindle $m$ which carries the arm.

Starting from the position shown in the drawings and after moving through an appropriate distance in the direction of the arrow, the projection $k$ will enter the lower end of the lower right hand slot $j$ and will impart rotary motion through the disc $i$ and gear wheel $g$, to the gear wheel $f$ and cylindrical member $b$. During the first part of its movement with the arm the projection $k$ will travel inwardly along the slot and during the second part will travel outwardly along the slot. Before the projection leaves the slot it has moved the latter to a position similar to that occupied by the upper right hand slot in the drawings, that is to say it will have moved the disc through 90°, and the cylindrical member $b$ through 72°. Meanwhile one of the ratchet pieces $c$ will have passed beneath the pawl $d$ and will have been brought to a position near to that occupied by the ratchet piece shown in the drawings in engagement with that pawl.

On the spindle $m$ there is also secured a cam $n$ acting on a lever $o$ which is used to impart vertical sliding movements to a slide $p$ carrying the pawl $e$. The lever $o$ is connected to the slide by a link $q$ terminating in a collar $r$ contained in a hollow cylindrical coupling $s$ which has attached to it another link $t$, motion being transmitted from the link $q$ to the coupling through a spring $u$ situated in the coupling. On the slide $p$ are mounted a pair of toggle links $w$ to one of which is attached the link $t$. During upward movement of the link $t$ it causes a corresponding movement to be given to the slide $p$ through the toggle links $w$, the pawl $e$ being thereby carried clear of the ratchet pieces $c$ on the cylindrical member $b$. This movement of the slide $p$ and pawl $e$ is effected immediately prior to the engagement of the arm projection $k$ with a radial slot $j$ in the disc $i$ as above described. During the continued rotation of the cam $n$ and after the cylindrical member $b$ has been rotated through a sufficient angle the cam returns the slide $p$ and brings the pawl $e$ adjacent to the approaching end of the next ratchet piece $c$. Finally and before the shaft $m$ ceases its movement the slide causes the pawl $e$ to engage that ratchet piece and impart a slight reverse movement to the cylindrical member $b$, so as to bring the ratchet piece which lies adjacent to the pawl $d$ into engagement with that pawl, the latter serving to determine the stationary position of the cylindrical member $b$. Also by the action of the link $t$ on the toggle links $w$ during the return movement of the slide $p$, a projection on one of the toggle links is caused to bear upon the adjacent ratchet piece $c$ for limiting the extent to which the toggles can approach central alignment.

In the application of my invention to the machine above described, I arrange on the spindle $m$ another cam $x$ adapted to depress the plunger $y$ of an oil pump $z$ through a thrust piece 2 and against the action of a spring 3 which serves to return the plunger and thrust piece after release by the cam $x$. The pump $z$ is contained in or connected to a lubricating oil sump 4, and is connected by one or more delivery pipes 5 to the lower part of the bearing $a$ carrying the cylindrical member $b$, the pipes 5 being adapted to discharge oil to the contiguous lower surfaces of the parts $a$, $b$.

The cam $x$ is so placed in relation to the arm $l$ that it operates the pump immediately prior to the movement of the cylindrical member $b$ by the arm and after the release of the cylindrical member $b$ by the actuation of the slide $p$. In this way a supply of lubricant to the lower contiguous surfaces of the parts $a$ and $b$ is effected immediately prior to each angular movement of the part $b$, thus facilitating such movement.

The invention is not limited to the example above described as it may also be applied to a body rotatable about a vertical axis and supported by a flat end surface on a corresponding bed, and also subordinate details may be varied to suit different requirements.

Having thus described my invention what I claim as new and desire to secure by Letters Patent is:

1. A machine tool comprising the combination with an intermittently rotatable cylindrical part adapted to carry a plurality of tools or work pieces, a bearing in which the said rotatable part is mounted with its axis horizontal, and means for securing the said rotatable part in its rest positions, of intermittently effective means for automatically introducing lubricant between the lower contiguous surfaces of the said rotatable part and bearing immediately prior to each movement of the said part.

2. A machine as claimed in claim 1, in which the lubricant supplying means comprise the combination with a spindle associated with the said rotatable part, of a cam mounted on the spindle, and a pump adapted to be actuated by the cam.

3. A machine tool as claimed in claim 1, in which the lubricant supplying means comprise the combination with a spindle for imparting intermittent rotary movements to the said rotatable part, of a cam mounted on the spindle, and a pump adapted to be actuated by the said cam.

DENNIS GREGORY.